US012706362B2

(12) United States Patent
Park et al.

(10) Patent No.: US 12,706,362 B2
(45) Date of Patent: Aug. 11, 2026

(54) SWITCHABLE FILTER

(71) Applicant: KMW INC., Hwaseong-si (KR)

(72) Inventors: Nam Shin Park, Hwaseong-si (KR); Joung Hoe Kim, Hwaseong-si (KR); Jung Hee Won, Suwon-si (KR); Kwang Nam Jeon, Seoul (KR); Won Jae Yoon, Yongin-si (KR); Hyung Sun Yoon, Suwon-si (KR)

(73) Assignee: KMW INC., Hwaseong-si (KR)

( * ) Notice: Subject to any disclaimer, the term of this patent is extended or adjusted under 35 U.S.C. 154(b) by 348 days.

(21) Appl. No.: 18/381,193

(22) Filed: Oct. 18, 2023

(65) Prior Publication Data

US 2024/0047842 A1 Feb. 8, 2024

Related U.S. Application Data

(63) Continuation of application No. PCT/KR2022/005582, filed on Apr. 19, 2022.

(30) Foreign Application Priority Data

Apr. 19, 2021 (KR) ........................ 10-2021-0050702
Apr. 19, 2022 (KR) ........................ 10-2022-0047911

(51) Int. Cl.
*H01P 1/208* (2006.01)
*H01P 3/12* (2006.01)

(52) U.S. Cl.
CPC ................ *H01P 1/208* (2013.01); *H01P 3/12* (2013.01)

(58) Field of Classification Search
CPC .......... H01P 1/208; H01P 3/12; H01P 1/2136; H03H 7/01; H03H 7/12
See application file for complete search history.

(56) References Cited

U.S. PATENT DOCUMENTS 2,514,678 A 7/1950 Southwarth
2011/0187477 A1 8/2011 Kunes
(Continued)

FOREIGN PATENT DOCUMENTS

JP 2001-024434 A 1/2001
JP 6526345 B1 * 6/2019 ............ H01P 1/2053
(Continued)

OTHER PUBLICATIONS

European Search Report dated May 23, 2025 from European Patent Office for Application No. 22791994.1.
(Continued)

*Primary Examiner* — Andrea Lindgren Baltzell
*Assistant Examiner* — Kimberly E Glenn

(57) ABSTRACT

The present invention relates to a switchable filter comprising: a filter unit in which a first filter group for filtering the frequency of a first frequency band is provided on one surface thereof and a second filter group for filtering the frequency of a second frequency band is provided on the other surface thereof on the basis of a center partition wall; and a frequency band switching unit, which moves to be adjacent to or separated from the one surface or the other surface of the filter unit, and thus converts a frequency band into the first frequency band or the second frequency band. Therefore, the deterioration of RF characteristics is prevented and selective conversion between frequency bands is facilitated.

19 Claims, 15 Drawing Sheets

(56) References Cited

U.S. PATENT DOCUMENTS

| | | | |
|---|---|---|---|
| 2015/0280298 | A1 | 10/2015 | Shiroyama et al. |
| 2016/0118702 | A1 | 4/2016 | Xu |
| 2018/0226705 | A1 | 8/2018 | Ernst et al. |

FOREIGN PATENT DOCUMENTS

| | | | | |
|---|---|---|---|---|
| KR | 10-2014-0110546 | A | 9/2014 | |
| KR | 10-2014-0128054 | A | 11/2014 | |
| KR | 10-2015-0016069 | A | 2/2015 | |
| KR | 10-1956222 | B1 | 3/2019 | |
| WO | WO-2021182668 | A1 * | 9/2021 | ............ H01P 1/2053 |

OTHER PUBLICATIONS

International Search Report mailed Jul. 25, 2022 for International Application No. PCT/KR2022/005582 and its English translation.

* cited by examiner

SWITCHABLE FILTER

CROSS-REFERENCE TO RELATED APPLICATIONS

This application is a continuation application of International Application No. PCT/KR2022/005582, filed Apr. 19, 2022, which claims the benefit of Korean Patent Application Nos. 10-2021-0050702, filed Apr. 19, 2021; and 10-2022-0047911, filed Apr. 19, 2022, in the Korean Intellectual Property Office, the disclosures of which are incorporated herein in their entirety by reference.

TECHNICAL FIELD

The present disclosure relates to a switchable filter, and more particularly, to a switchable filter, which can improve product versatility by making a dual frequency band filter, which is manufactured to fit a certain frequency band range allocated differently for each region or country, facilitate an application of frequency switching utilizing a frequency band switching unit.

BACKGROUND ART

With the evolution of mobile communication technology, the data transmission speed has been exponentially increased, and for improvement of transmission/reception sensitivity in accordance with an increase of data transmission, the transmission power of a base station is gradually increasing.

A duplexer that is used as essential equipment to prevent interferences between transmission/reception ends in the base station is mainly implemented by using a coaxial resonator of an aluminum material having high power resistance characteristics in order to endure high power.

Further, since the duplexer that is used in the base station requires sharp skirt characteristics, it is very sensitive to mechanical tolerances, and the filter characteristics required in the duplexer can be implemented by adjusting a resonance frequency through application of metal tuning screws onto an upper cover of a housing constituting a coaxial resonator.

As described above, a filter is a device for passing only a signal of a specific frequency band among input frequency signals, and is being implemented in various forms in addition to the above-described duplexer. A band-pass frequency of an RF filter is determined by an inductance component and a capacitance component of the filter, and as described above, a work for adjusting the band-pass frequency of the filter is called tuning.

Meanwhile, in a communication system such as a mobile communication system, a specified frequency band is allocated to service providers, and the allocated frequency band may be divided into several channels to be used. In the related art, telecommunications service providers have separately produced and used filters that are suitable for respective frequency bands.

For this reason, in the related art, in case that the filter is once manufactured to suit the allocated frequency band, it is required to replace the filter by another suitable filter in order to filter a different frequency band, or in case that two band filters are manufactured and simultaneously included in one filter assembly so as to suit respective allocated frequency bands, the frequency bands are switched by using an RF switch.

However, the RF switch is manufactured by utilizing sections of an input port and an output port of the filter and is installed for each port, and if a lot of filter assemblies are present, the corresponding number of RF switches should be installed, so that an insertion loss gets worse, and a PIMD level is lowered to cause the occurrence of problems in that the RF switches are unable to be used at high standards, and the cost increases as the number of RF switches is increased.

DISCLOSURE

Technical Problem

The present disclosure has been devised to solve the above technical problems, and an object of the present disclosure is to provide a switchable filter including a frequency band switching unit that can improve the RF characteristics and facilitate the selection of frequency bands.

The technical problems of the present disclosure are not limited to the above-described technical problems, and other unmentioned technical problems may be clearly understood by those skilled in the art from the following descriptions.

Technical Solution

A switchable filter according to an embodiment of the present disclosure includes: a filter unit provided with a first filter group configured to filter a frequency of a first frequency band on one surface thereof and a second filter group configured to filter a frequency of a second frequency band on the other surface thereof based on a center partition wall; and a frequency band switching unit configured to switch the frequency band to any one of the first frequency band and the second frequency band by moving to be adjacent to or spaced apart from any one of the one surface and the other surface of the filter unit.

Here, the filter unit may include a filter body provided as a cavity filter including a plurality of cavities through which the first filter group and the second filter group are open in directions of the one surface and the other surface, respectively, and a plurality of resonance bar tuning screws disposed in the plurality of cavities, respectively; and the frequency band switching unit may include a first filter side short unit configured to come in contact with the resonance bar tuning screw of the first filter group while moving to be adjacent to the one surface of the filter body, and to be spaced apart from the resonance bar tuning screw while moving to be spaced apart from the one surface of the filter body; and a second filter side short unit configured to come in contact with the resonance bar tuning screw of the second filter group while moving to be adjacent to the other surface of the filter body, and to be spaced apart from the resonance bar tuning screw while moving to be spaced apart from the other surface of the filter body.

Further, the first filter side short unit and the second filter side short unit may be provided as a plurality of short pin modules of a metal material, being electrically shorted when coming in contact with a front end of the resonance bar tuning screw.

Further, the frequency band switching unit may include: a short driving unit configured to be electrically driven and to generate a specific switching driving force; a transfer panel configured to receive the switching driving force transferred from the short driving unit and to move for straight reciprocating in a thickness direction of the filter unit; and a first filter side short panel and a second filter side short panel connected to an end part of the transfer panel, respectively, provided on outsides of the one surface and the other surface of the filter body, and configured to simultaneously move the first filter side short unit and the second filter side short unit in the same direction.

Further, an inner space of the filter body may be shielded from an outside by one side outer cover panel and the other side outer cover panel, and the transfer panel, the first filter side short panel, and the second filter side short panel may move in the inner space.

Further, the short driving unit may be provided as one of each on one side and the other side in a length direction of the filter body.

Further, the frequency band switching unit may activate the first filter group and may simultaneously inactivate the second filter group while making the first filter side short panel be spaced apart from the resonance bar tuning screw of the first filter side short part and simultaneously making the second filter side short panel come in contact with the resonance bar tuning screw of the second filter side short unit.

Further, the short driving unit may include: a driving unit box provided in an one side inner space and the other side inner space in a length direction of the filter body; a driving motor provided inside the driving unit box and configured to be electrically driven; a gear set being gear-tooth-engaged with the driving motor to be rotated; and a transfer gear configured to transfer the switching driving force transferred from the gear set toward the transfer panel side.

Further, the gear set may include a worm gear provided at a front end of a motor shaft of the driving motor and a worm wheel gear tooth-engaged with the worm gear, and may be configured to prevent the first filter side short panel and the second filter side short panel from moving randomly.

Further, the transfer gear may include: a shaft connected to the gear set and configured to be rotated; and a cam panel configured to be eccentrically rotated about the shaft, wherein the cam panel may be disposed to be inserted into and inside of a cam slot formed on the transfer panel.

Further, the driving motor may be supplied with a power from an ASIG port configured to supply the power to the filter body to be driven.

Further, the plurality of short pin modules may include: a plurality of combination blocks combined with inner surfaces of the first filter side short panel and the second filter side short panel; a plurality of short pins extending from the plurality of combination blocks toward the resonance bar tuning screws; and a plurality of signal shield washers provided on the plurality of combination blocks, respectively, and disposed annularly around the plurality of short pins.

Further, the plurality of signal shield washers may include: ring combination units locating the plurality of short pins in centers thereof, and combined with the plurality of combination blocks, respectively; and a plurality of elastic support units formed along inner borders of the ring combination units, and extending to be inclined toward the first filter side short panel or the second filter side short panel.

Further, the plurality of short pins may be elastically supported in a direction of the resonance bar tuning screw.

Further, the plurality of short pin modules may be spaced apart from the resonance bar tuning screw of the first filter group and may simultaneously come in contact and be shorted with the resonance bar tuning screw of the second filter group, or may come in contact and be shorted with the resonance bar tuning screw of the first filter group and may simultaneously be spaced apart from the resonance bar tuning screw of the second filter group.

Further, the number of the plurality of short pin modules may correspond to or may be smaller than the number of the resonance bar tuning screws of the first filter group or the number of the resonance bar tuning screws of the second filter group.

Further, the frequency band switching unit may include: a short driving unit configured to be electrically driven and to generate a specific switching driving force; and a first filter side short panel and a second filter side short panel configured to receive the switching driving force transferred from the short driving unit, provided on outsides of the one surface and the other surface of the filter unit, and configured to simultaneously move the first filter side short unit and the second filter side short unit in the same direction.

Further, a single number of the short driving unit may be provided in a middle part of the filter body.

Further, the short driving unit may include: a stator connected to the filter body; a rotator connected to any one of the first filter side short panel and the second filter side short panel; and a rotary shaft configured to be rotated in association with the rotator and to be screw-rotated through penetration of the stator.

Advantageous Effects

According to the switchable filter according to an embodiment of the present disclosure, the RF characteristics can be improved, and the frequency band selection switching can be facilitated.

Effects of the present disclosure are not limited to the above-mentioned effects, and other unmentioned effects will be able to be clearly understood by those skilled in the art from the description of claims.

EXPLANATION OF SYMBOLS

Figure 1A:
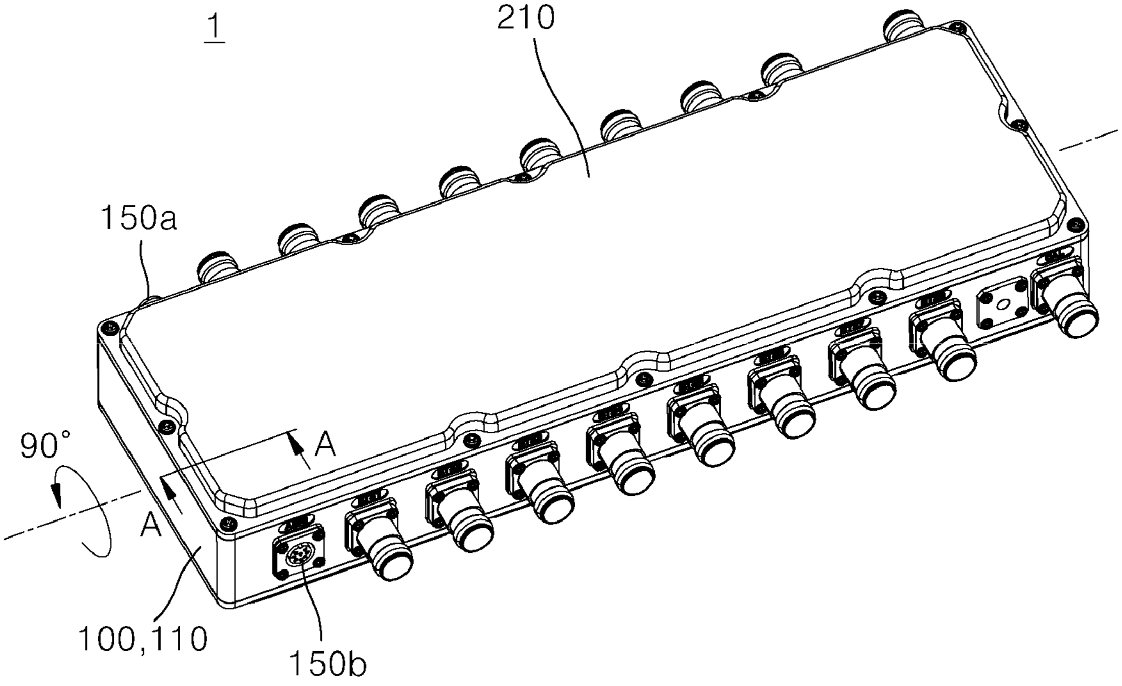
FIGS. 1A and 1B are perspective views illustrating an external appearance of a switchable filter according to an embodiment of the present disclosure.

1: switchable filter 50A: first filter group
50B: second filter group 100: filter unit
110: filter body 120: cavity
130: resonance bar 135: resonance bar tuning screw
140*a,* 140*b:* installation space 150*a:* ASIG in-port
150*b:* ASIG out-port 160*a:* one side filter cover
160*b:* the other side filter cover 210: one side outer cover panel
220: the other side outer cover panel 00: frequency band switching unit
320: transfer panel 325: cam slot
350*a:* first filter side short panel 350*b:* second filter side short panel
360*a,* 360*b:* short pin module 361: combination block
363: short pin 365: signal shield washer
367: pin spring 400: short driving unit
400*a:* one side short driving unit 400*b:* the other side short driving unit
410: control printed circuit board 420*a,* 420*b:* driving unit box
431: motor printed circuit board 432: driving motor
433: worm gear 434, 435: gear set
440: transfer gear 441: shaft
443: cam panel

MODE FOR INVENTION

Hereinafter, a switchable filter according to embodiments of the present disclosure will be described in detail with reference to the exemplary drawings.

In adding reference numerals to constituent elements in the drawings, it is to be noted that the same constituent elements have the same reference numerals as much as possible even if they are represented in different drawings. Further, in explaining embodiments of the present disclosure, the detailed explanation of related known configurations or functions will be omitted if it is determined that the detailed explanation interferes with understanding of the embodiments of the present disclosure.

The terms, such as "first, second, A, B, (a), and (b)", may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

Figure 1B:
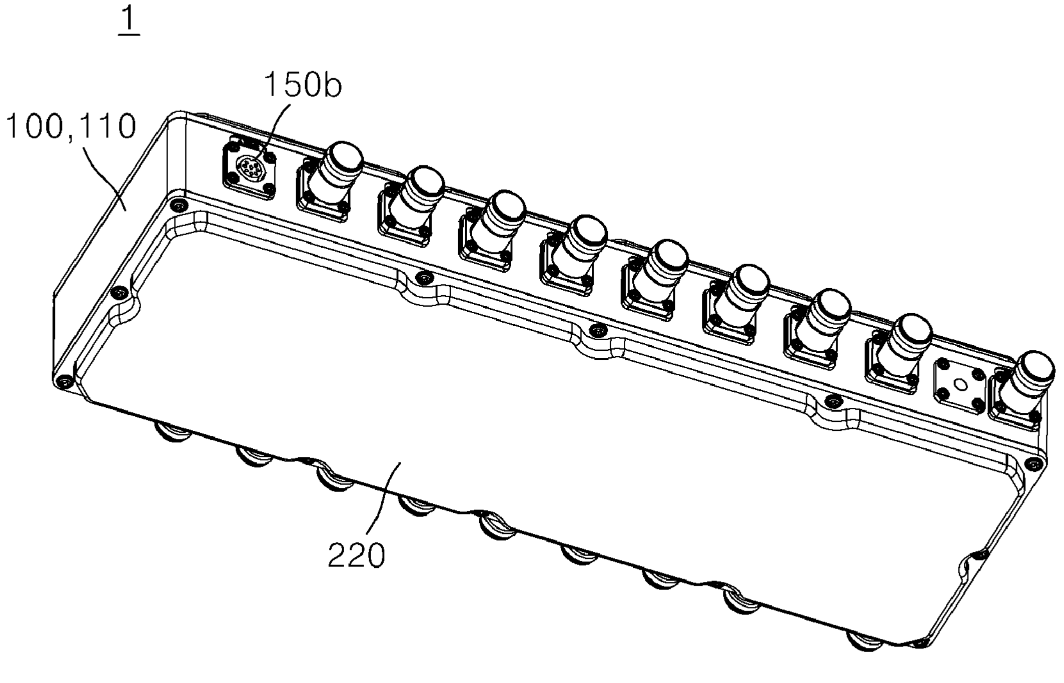
Figure 2:
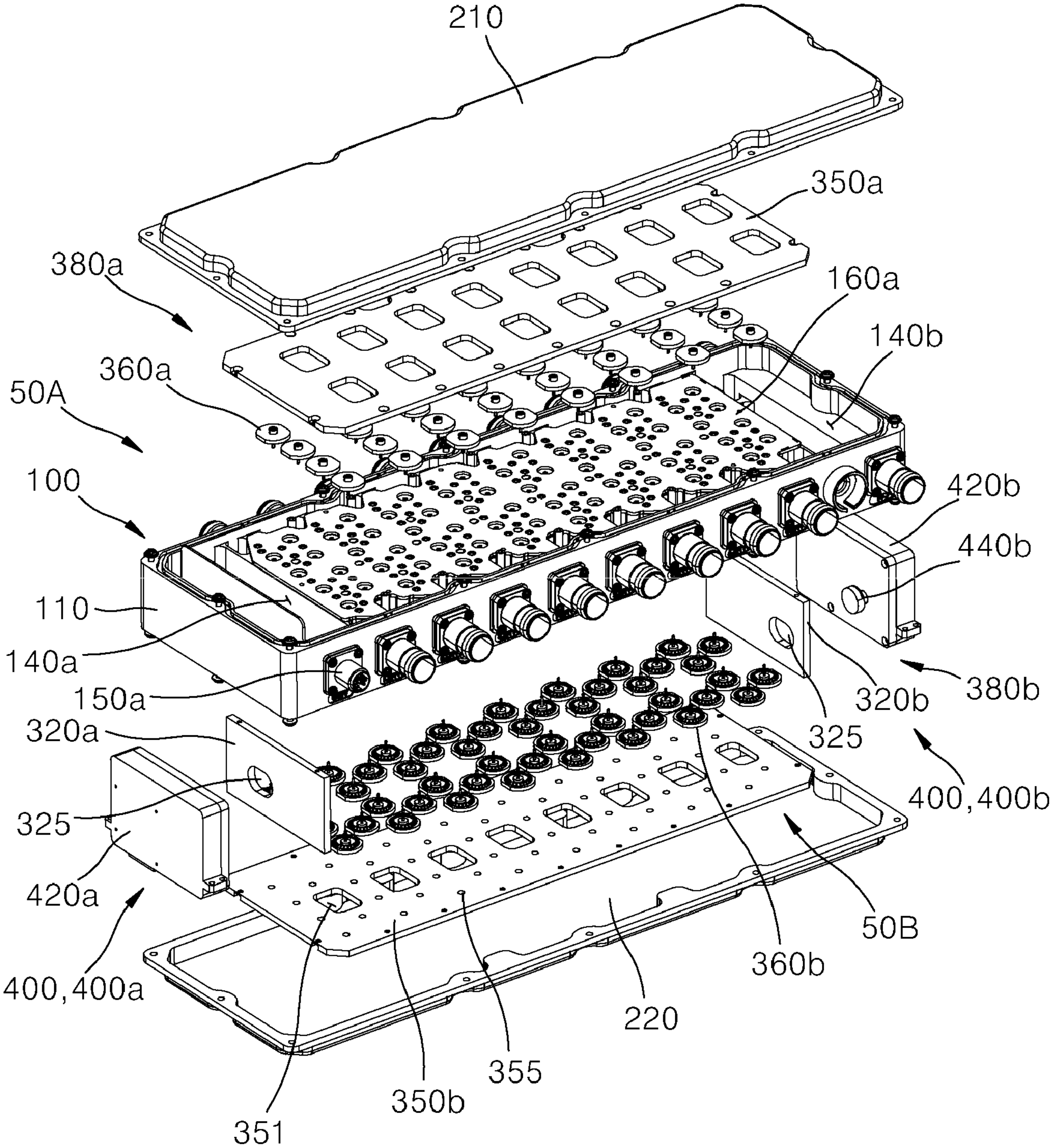
FIG. 2 is an exploded perspective view of FIG. 1A.
Figure 3:
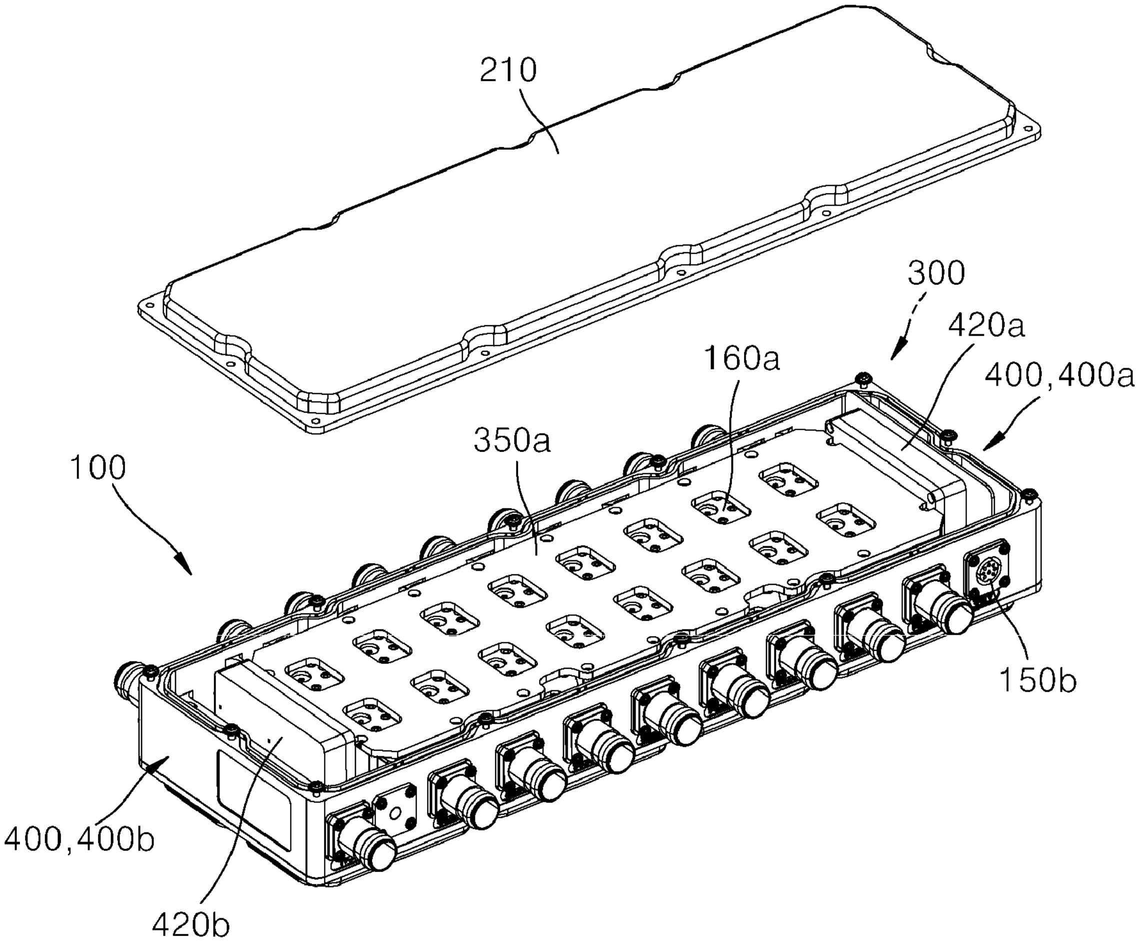
FIG. 3 is an internal perspective view illustrating a state where an outer cover panel among constitutions of a switchable filter is separated according to an embodiment of the present disclosure.
Figure 4:
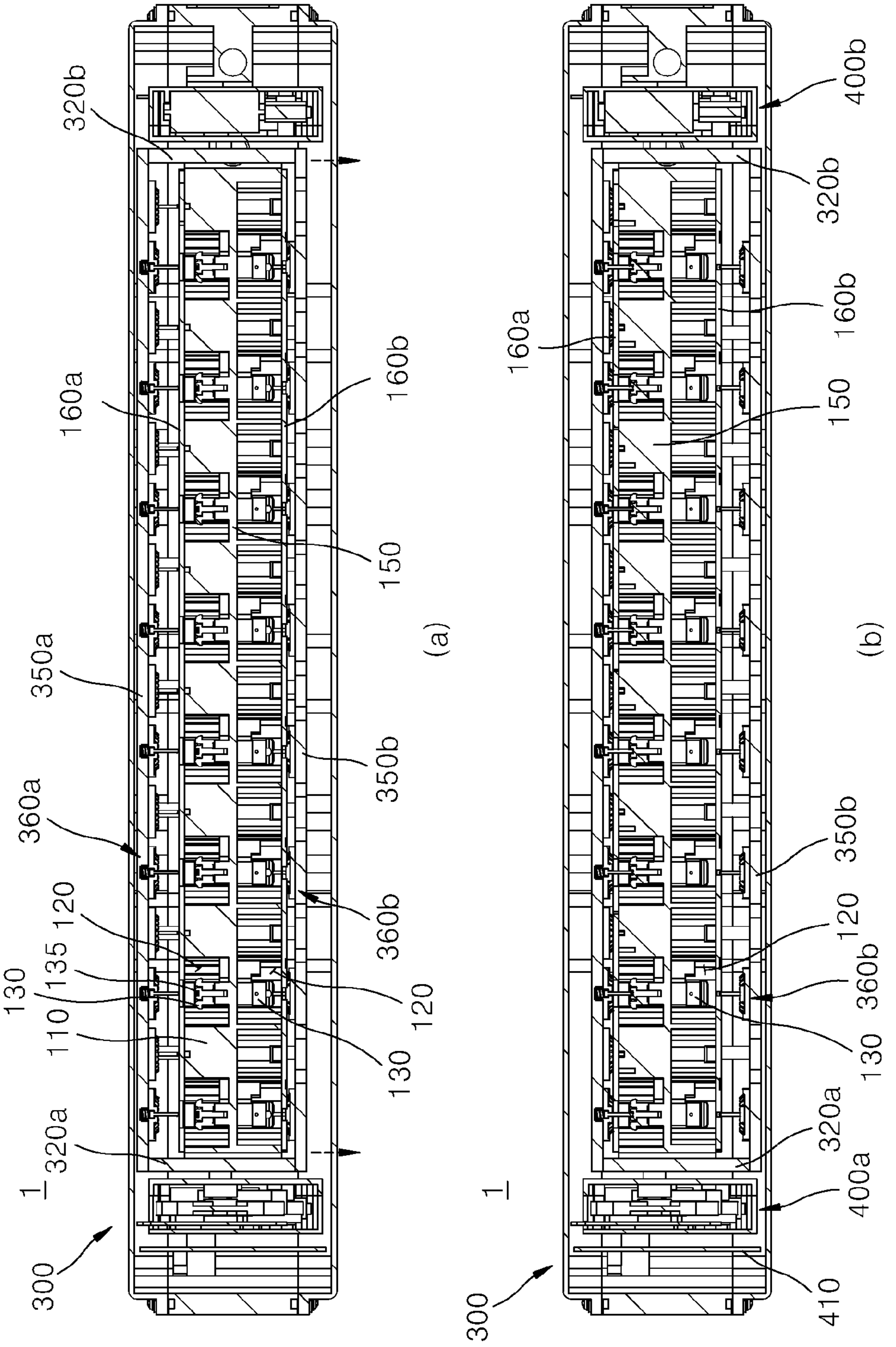
FIG. 4 is a cross-sectional view illustrating a state before and after a frequency band switching unit among constitutions of a switchable filter is operated according to an embodiment of the present disclosure.
Figure 5A:
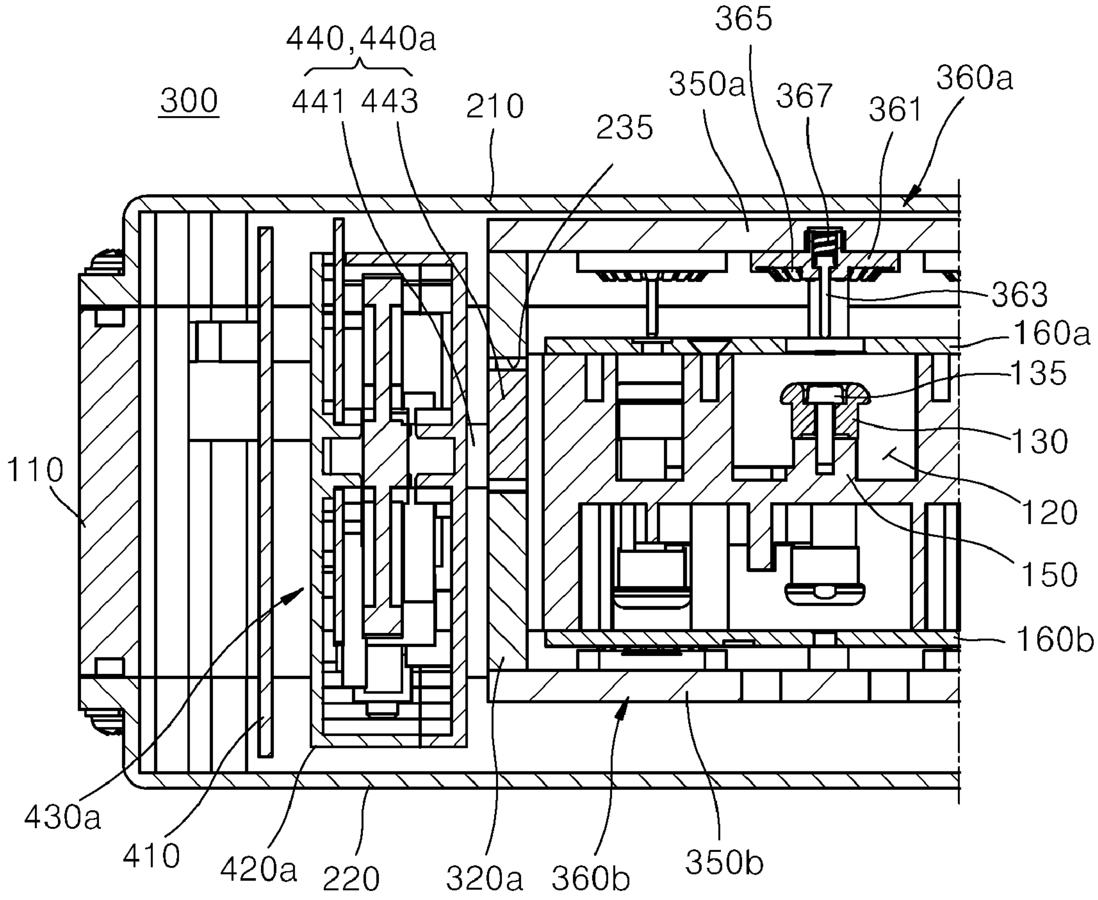
FIGS. 5A and 5B are a cross-sectional view and a cutaway perspective view taken along line A-A of FIG. 1A.
Figure 5B:
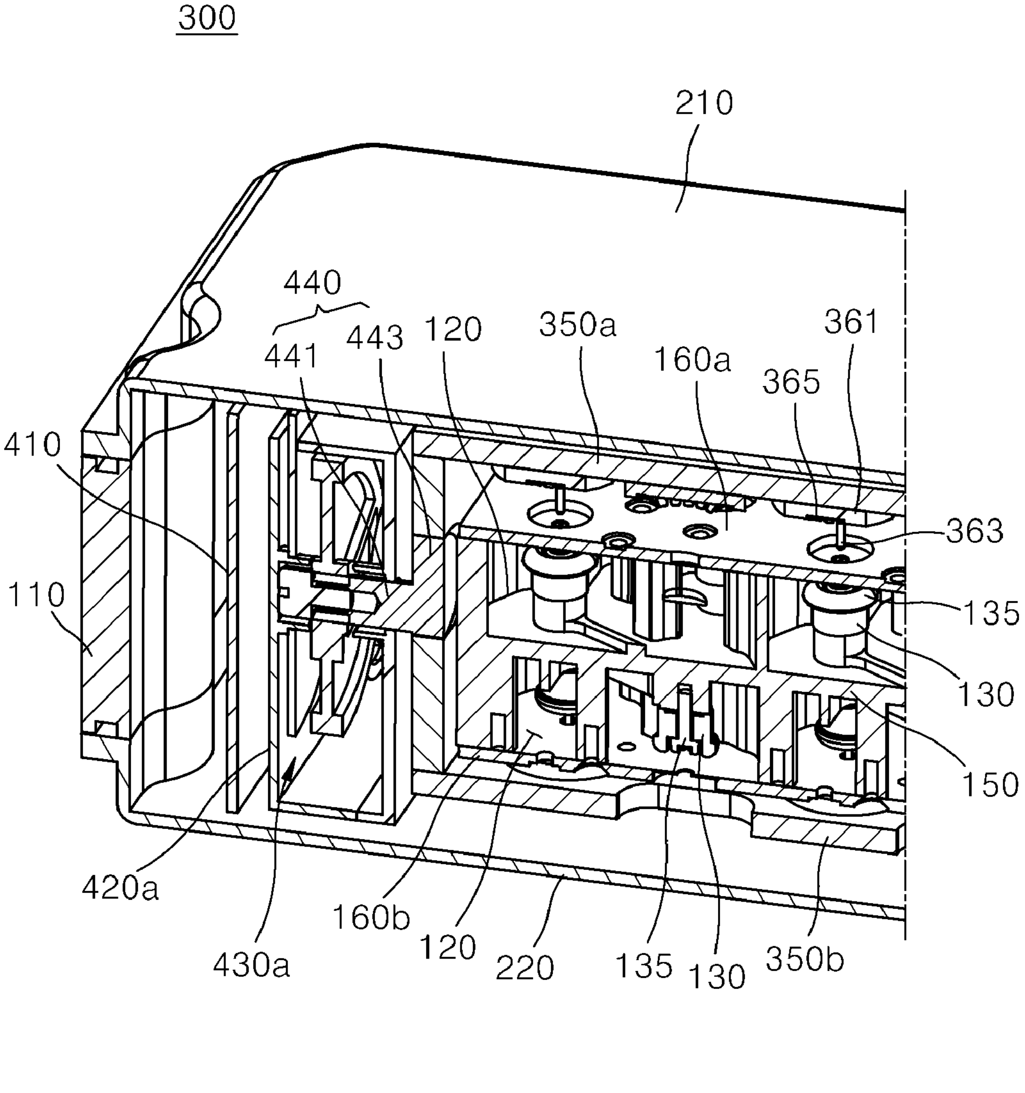
Figure 6:
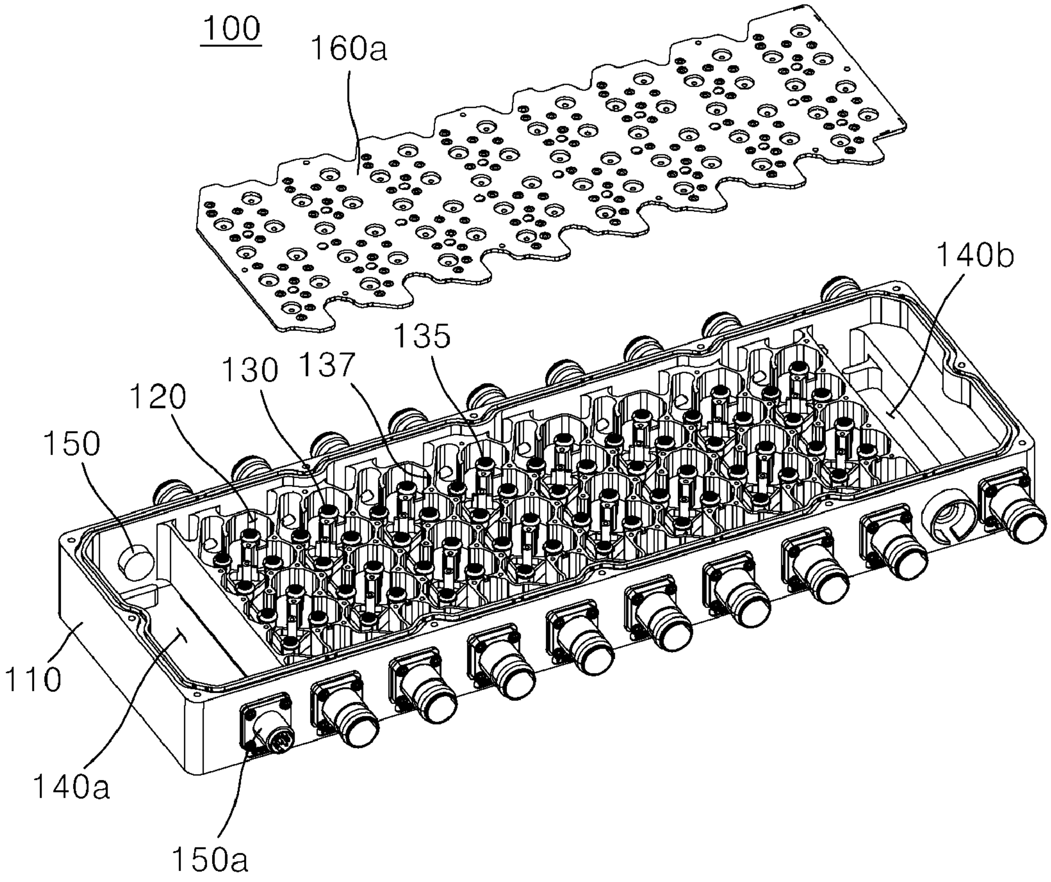
FIG. 6 is an exploded perspective view illustrating a filter body among constitutions of a switchable filter according to an embodiment of the present disclosure.

FIGS. 1A and 1B are perspective views illustrating an external appearance of a switchable filter according to an embodiment of the present disclosure, and FIG. 2 is an exploded perspective view of FIG. 1A. FIG. 3 is an internal perspective view illustrating a state where an outer cover panel among constitutions of a switchable filter is separated according to an embodiment of the present disclosure. FIG. 4 is a cross-sectional view illustrating a state before and after a frequency band switching unit among constitutions of a switchable filter is operated according to an embodiment of the present disclosure. FIGS. 5A and 5B are a cross-sectional view and a cutaway perspective view taken along line A-A of FIG. 1A. FIG. 6 is an exploded perspective view illustrating a filter body among constitutions of a switchable filter according to an embodiment of the present disclosure.

As referenced in FIGS. 1A to 6, a switchable filter 1 according to an embodiment of the present disclosure includes a filter unit 100 provided with a first filter group configured to filter a frequency of a first frequency band on one surface thereof and a second filter group configured to filter a frequency of a second frequency band on the other surface thereof based on a center partition wall 150 (particularly, refer to FIG. 2).

More specifically, as referenced in FIGS. 2 and 6, the filter part 100 includes a filter body 110 formed in an approximately rectangular shape. A plurality of cavities 120 may be provided on one surface in a thickness direction of the filter body 110, a first filter group 50A in which resonance bars 130 and resonance bar tuning screws 135 are respectively installed inside the plurality of cavities 120 may be provided, a plurality of cavities 120 may also be provided on the other surface in the thickness direction of the filter body 110 in the same manner, and a second filter group 50B in which resonance bars 130 and resonance bar tuning screws 135 are respectively installed inside the plurality of cavities 120 may be provided.

On an outer side of one surface of the filter body 110 on which the first filter group 50A is provided, one side filter cover 160*a* may be provided to cover all of the plurality of cavities 120, and on an outer side of the other surface of the filter body 110 on which the second filter group 50B is provided, the other side filter cover 160*b* (refer to FIG. 4) may be provided to cover all of the plurality of cavities 120.

Although various kinds of filters for filtering a signal of a specific frequency band may be adopted, explanation will be made on the assumption that the switchable filter 1 according to an embodiment of the present disclosure is provided as a cavity filter in which the plurality of cavities 120 are provided in the filter body 110 made of a dielectric material, and the resonance bars 130 and the resonance bar tuning screws 135, which serve as resonators, are provided in the cavities 120, respectively.

The first filter group 50A and the second filter group 50B may have different frequency bands, and for example, the first filter group 50A may be provided as a first band pass filter BPF1 capable of performing frequency filtering of a 100 MHz band, and the second filter group 50B may be provided as a second band pass filter BPF2 capable of performing frequency filtering of a 280 MHz band.

For implementation of the first band pass filter BPF1 and the second band pass filter BPF2, the first filter group 50A and the second filter group 50B may be provided in the form of cavities 120 pre-designed to suit the respective frequency bands, and in case that an antenna device is installed in a specified area, only any one of the first filter group 50A and the second filter group 50B, which suits the frequency band of the corresponding installation area, may be operated.

If specified signals are input to respective filter ends, the first filter group 50A may filter and output the signals so that the input signals are implemented as desired RF characteristic values within a range of the first band pass filter BPF1 through frequency filtering actions of the resonance bars 130 and the resonance bar tuning screws 135 in the plurality of cavities 120, and if the specified signals are input to the respective filter ends, the second filter group 50B may filter and output the signals so that the input signals are implemented as desired RF characteristic values within a range of the second band pass filter BPF2 through frequency filtering actions of the resonance bars 130 and the resonance bar tuning screws 135 in the plurality of cavities 120.

Here, by designing the shape of the plurality of cavities of the filter body 110 provided as the cavity filter, different frequency bands may be allocated so as to separate the functions of the first filter group 50A and the second filter group 50B, and by performing fine tuning of the resonance bars 130 and the resonance bar tuning screws 135 installed inside the plurality of cavities 120, fine frequency adjustment may be performed within the range of the first band pass filter BPF1 or the second band pass filter BPF2.

Figure 7A:
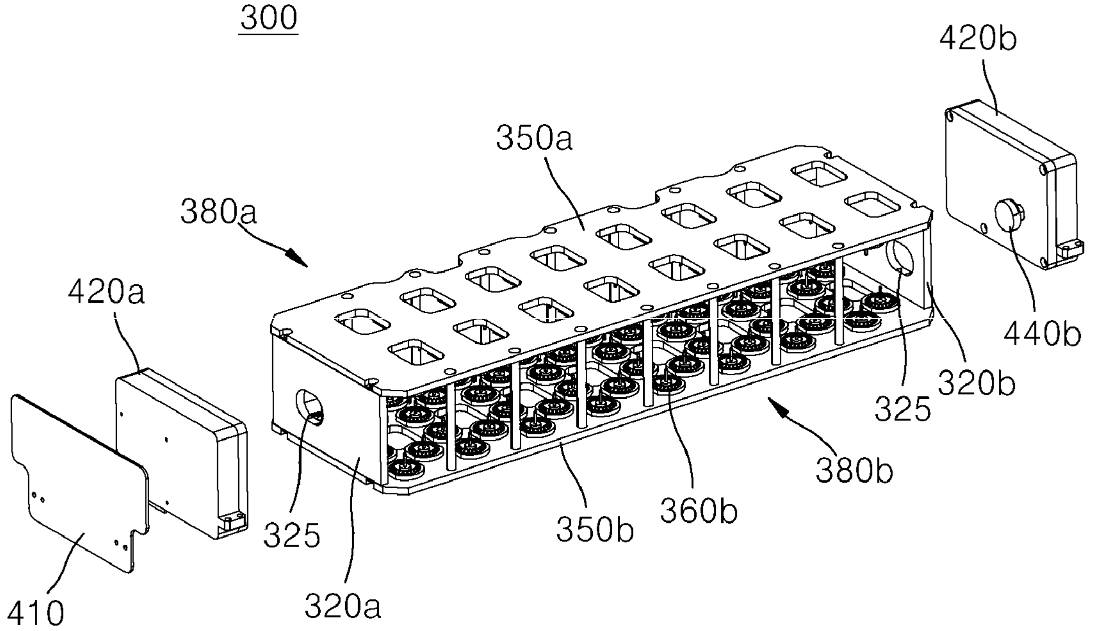
FIGS. 7A and 7B are exploded perspective views illustrating a frequency band switching unit among constitutions of a switchable filter according to an embodiment of the present disclosure.
Figure 7B:
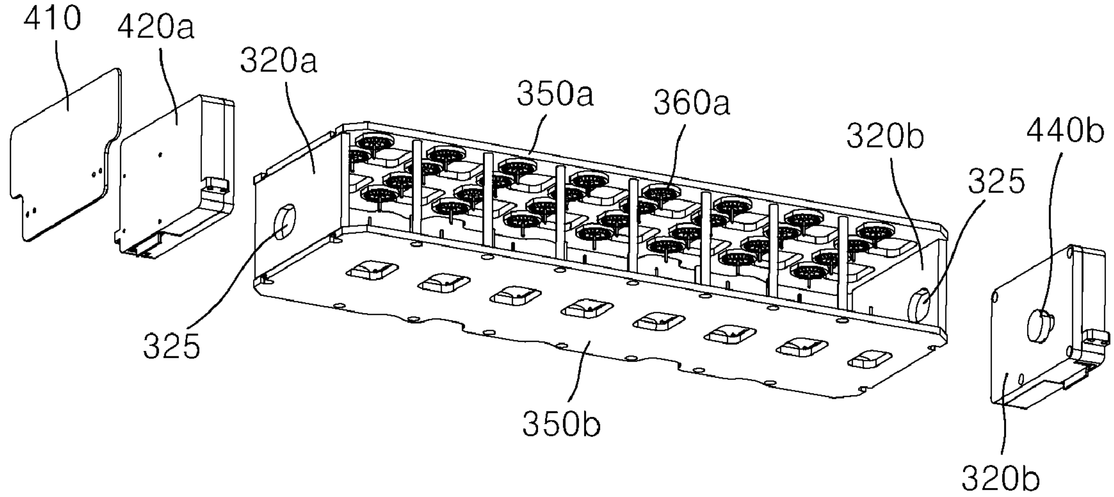
Figure 8:
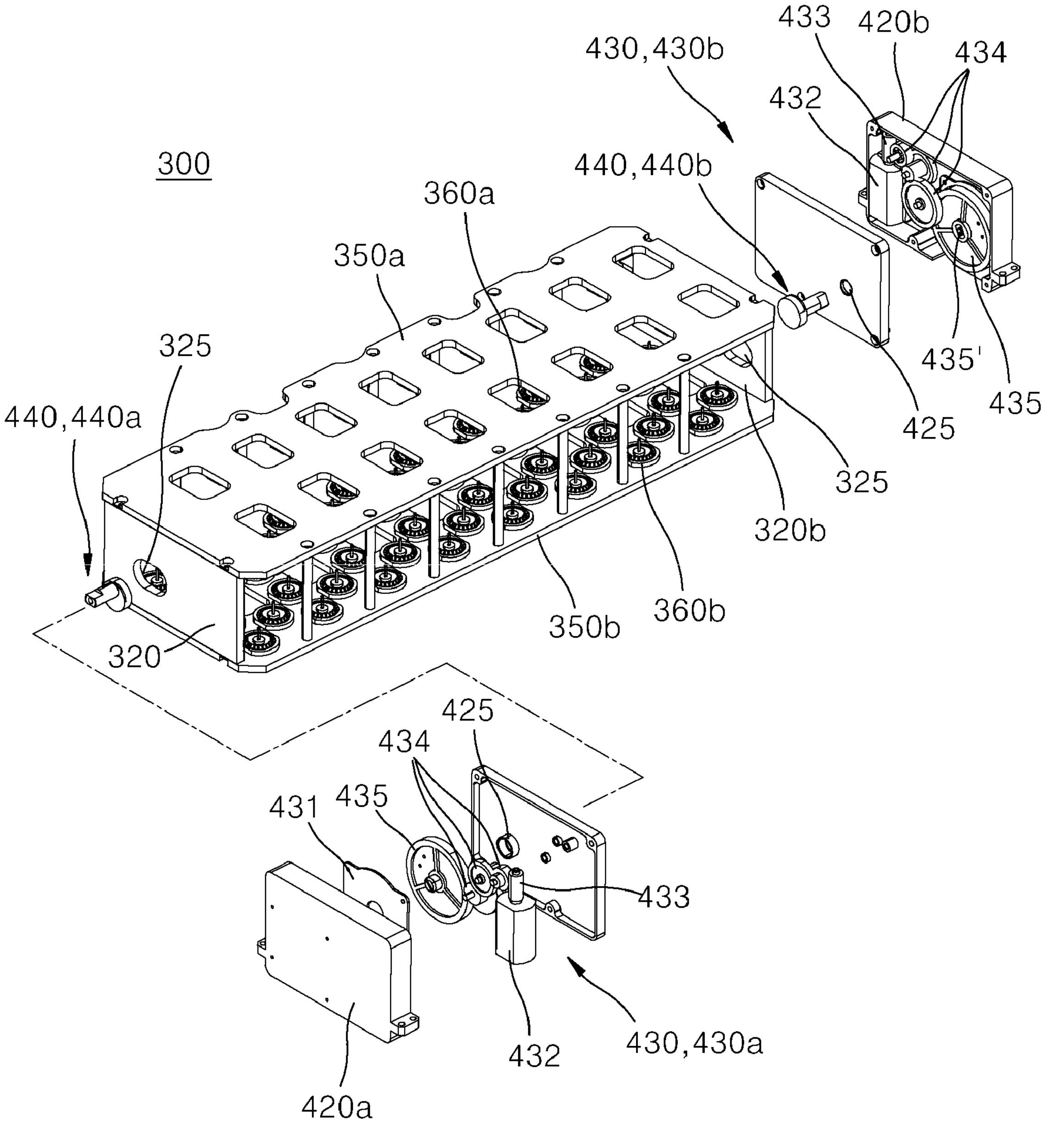
FIG. 8 is an exploded perspective view illustrating in detail a short driving unit among constitutions of FIGS. 7A and 7B.

FIGS. 7A and 7B are exploded perspective views illustrating a frequency band switching unit among constitutions of a switchable filter according to an embodiment of the present disclosure, and FIG. 8 is an exploded perspective view illustrating in detail a short driving unit among constitutions of FIGS. 7A and 7B.

As referenced in FIGS. 1A to 8, a switchable filter 1 according to an embodiment of the present disclosure may further include a frequency band switching unit 300 configured to switch the frequency band to any one of the first frequency band and the second frequency band by moving to be adjacent to or spaced apart from any one of the one surface and the other surface of a filter body 110 of a filter unit 100.

At one end part and the other end part in a length direction of the filter body 110, one side installation space 140*a* and the other side installation space 140*b* to be described later, in which a short driving unit 400 and transfer panels 320*a* and 320*b* among constitutions of a frequency band switching unit 300 are installed to be accommodated, may be formed as a space that is penetrated in a front-to-back thickness direction.

Here, as referenced in FIGS. 1A and 1B, the frequency band switching unit 300 may be installed inside the filter unit 100 so that it is not observed from an outside by one side outer cover panel 210 and the other side outer cover panel 220 which cover and shield one surface and the other surface of the filter body 110.

The frequency band switching unit 300 as described above may include: a first filter side short unit 380*a* configured to come in contact with the resonance bar tuning screw 135 of a first filter group 50A while moving to be adjacent to the one surface of the filter unit 100, and to be spaced apart from the resonance bar tuning screw 135 while moving to be spaced apart from the one surface of the filter unit 100; and a second filter side short unit 380*b* configured to come in contact with the resonance bar tuning screw 135 of a second filter group 50B while moving to be adjacent to the other surface of the filter unit 100, and to be spaced apart from the resonance bar tuning screw 135 while moving to be spaced apart from the other surface of the filter unit 100.

Here, the first filter side short unit 380*a* and the second filter side short unit 380*b* may be provided as a plurality of short pin modules 360*a* and 360*b* of a metal material, being electrically shorted when coming in contact with a front end of the resonance bar tuning screw 135.

Meanwhile, as referenced in FIGS. 3 to 5B, the frequency band switching unit 300 may include: a short driving unit 400, 400*a*, or 400*b* configured to be electrically driven and to generate a specific switching driving force; a transfer panel 320*a* or 320*b* configured to receive the switching driving force transferred from the short driving unit 400, 400*a*, or 400*b* and to move for straight reciprocating in a thickness direction of the filter unit 100; and a first filter side short panel 350*a* and a second filter side short panel 350*b* connected to an end part of the transfer panel 320*a* or 320*b*, respectively, provided on outsides of the one surface and the other surface of the filter unit 100, and configured to simultaneously move the first filter side short unit 380*a* and the second filter side short unit 380*b* in the same direction.

Meanwhile, the frequency band switching unit 300 may activate the first filter group 50A and may simultaneously inactivate the second filter group 50B while making the first filter side short panel 350*a* be spaced apart from the resonance bar tuning screw 135 of the first filter side short part 380*a* and simultaneously making the second filter side short panel 350*b* come in contact with the resonance bar tuning screw 135 of the second filter side short unit 380*b*.

Here, the short driving unit 400, 400*a*, or 400*b* may be provided as one of each as a pair in one side installation space 140*a* and the other side installation space 140*b* formed at one end part and the other end part in the length direction of the filter body 110 (refer to drawing reference numerals 400*a* and 400*b*). Hereinafter, the short driving unit 400 installed in the one side installation space 140*a* is called the one side short driving unit 400*a*, and the short driving unit 400 installed in the other side installation space 140*b* is called the other side short driving unit 400*b*. For reference, in the one side installation space 140*a* in which the one side short driving unit 400*a* is installed, a control printed circuit board 410 for controlling the operation of the filter unit 100 may be further installed.

In the same manner, the transfer panel 320*a* or 320*b* may be provided as a pair, in a manner that one side transfer panel 320*a* is installed in one side installation space 140*a* of one end part in the length direction of the filter body 110 to receive the switching driving force transferred from the one side short driving unit 400*a*, and the other side transfer panel 320*b* is installed in the other side installation space 140*b* of the other end part in the length direction of the filter body 110 to receive the switching driving force transferred from the other side short driving unit 400*b*.

As referenced in FIGS. 7A to 8, each of the one side short driving unit 400*a* and the other side short driving unit 400*b* may include: a driving unit box 420*a* or 420*b* provided in an one side inner space 140*a* that is an one side inner space in the length direction of the filter body 110 and the other side inner space 140*b* that is the other side inner space in the length direction of the filter body; a driving motor 432 provided inside the driving unit box 420*a* or 420*b* and configured to be electrically driven; a gear set 434 or 435 being gear-tooth-engaged with the driving motor 432 to be rotated; and a transfer gear 440 configured to transfer the switching driving force transferred from the gear set 434 or 435 toward the transfer panel 320*a* or 320*b*. In addition, a motor printed circuit board 431 for controlling the operation of the driving motor 432 may be installed inside the driving unit box 420*a* or 420*b*.

The driving motor 432 may be provided as a motor of which the position can be controlled by the motor printed circuit board 431.

The gear set 434 or 435 is a combination of a plurality of gears having various gear ratio, and serves to reduce the switching driving force that is transferred from the driving motor 432 by a specified gear ratio combination and to transfer the reduced switching driving force toward the transfer gear 440.

More specifically, one 434 of the gear sets 434 and 435, which functions as an input gear, may be provided as a worm wheel gear tooth-engaged with a worm gear 433 provided at a front end of a motor shaft of the driving motor 432, and the transfer gear 440 may be connected to the other 435 of the gear sets 434 and 435, which functions as an output gear, and may receive the transferred reduced switching driving force. Between the gear 434 that functions as the input gear and the gear 435 that functions as the output gear, a plurality of reduction ratio gears (not denoted by reference numerals) are connected and tooth-engaged with one another to obtain a desired reduction ratio. Here, the worm gear 433 provided at the front end of the motor shaft of the driving motor 432 may be tooth-engaged with the gear 434 provided as the above-described worm wheel gear, and may perform a brake function for preventing the first filter side short panel 350*a* and the second filter side short panel 350*b* from moving randomly.

Meanwhile, the transfer gear 440 may include: a shaft 441 rotatably connected to any one 435 of the gear set 434 and 435 that functions as the output gear; and a cam panel 443 configured to be eccentrically rotated about the shaft 441.

Here, the front end of the shaft 441 of the transfer gear 440 may be fitted into a shaft groove 435' formed on the gear 435 that functions as the output gear. The shaft 441 as above may extend to an outside through a through-hole 425 formed on the driving unit box 420*a* or 420*b*.

The cam panel 443 may have a rotary shaft that is eccentric about the shaft 441 in a fixed state, and during rotation, an outer peripheral end thereof may move within an eccentric range in a thickness direction of the filter body 110. Since the above-described cam panel 443 is disposed to be inserted into a cam slot 325 formed on the transfer panel 320, the transfer panel 320 may move in a straight line within the above-described eccentric range in the thickness direction of the filter body 110 during the rotating movement of the cam panel 443.

The transfer gear 440 may also be provided as a pair of one side transfer gear 440*a* provided to be connected to the one side short driving unit 400*a* and the other side transfer gear 440*b* provided to be connected to the other short driving unit 400*b*.

Accordingly, since the one side transfer gear 440*a* is connected to the one side transfer panel 320*a*, and the other side transfer gear 440*b* is connected to the other transfer panel 320*b*, a pair of driving motors 432 are simultaneously driven at one side end part and the other side end part of the filter body 110, and thus can stably move the first filter side short panel 350*a* and the second filter side short panel 350*b* at the same time.

Here, on one side and the other side in a width direction of the filter body 110, an ASIG in-port 150*a* and an ASIG out-port 150*b* for supplying and outputting a specified power to the first filter group 50A and the second filter group 50B provided as a combination of a plurality of cavities 120, and the driving motors 432 of the one side short driving unit 400*a* and the other side short driving unit 400*b* may supply and output the power through the above-described ASIG ports 150*a* and 150*b*.

As described above, if the power is supplied to the one side short driving unit 400*a* and the other side short driving unit 400*b* through the ASIG ports 150*a* and 150*b*, the driving motor 432 is rotated on one side, and as the worm gear 433 provided at the front end of the motor shaft of the driving motor 432 is rotated, the switching driving force is reduced through the gear set 434 and 435 and then is transferred to the transfer gear 440. Therefore, the cam panel 443 of the transfer gear 440 is eccentrically rotated between the cam slots formed on the one side transfer panel 320*a* and the other side transfer panel 320*b*, and moves a pair of transfer panels 320*a* and 320*b* in the thickness direction of the filter body 110 in a manner that it moves the pair of transfer panels in the same direction so that the short pin module 360*a* provided on the first filter side short panel 350*a* is spaced apart from the resonance bar tuning screw 135 of the first filter group 50A to make implementation of the first band pass filter BPF1 possible, and at the same time, the short pin module 360*b* provided on the second filter side short panel 350*b* comes in contact and is shorted with the resonance bar tuning screw 135 of the second filter group 50B to make implementation of the second band pass filter BPF2 impossible.

Meanwhile, as referenced in FIGS. 5A and 5B, the plurality of short pin modules 360*a* and 360*b* may include: a plurality of combination blocks 361 combined with inner surfaces of the first filter side short panel 350*a* and the second filter side short panel 350*b*; a plurality of short pins 363 extending from the plurality of combination blocks 361 toward the respective resonance bar tuning screws 135; and a plurality of signal shield washers 365 provided on the plurality of combination blocks 361, respectively, and disposed annularly around the plurality of short pins 363.

The signal shield washers 365 may serve to prevent signal leakage to the outside when a signal flow between the cavities 120 is shorted through the plurality of short pins 363.

Further, for example, when the first filter side short panel 350*a* approaches the one side filter cover 160*a* of the first filter group 50A, the signal shield washers 365 come in elastic contact with an outer surface of the one side filter cover 160*a*, and thus serves to easily absorb an operating tolerance between the first filter side short panel 350*a* and the one side filter cover 160*a*.

More specifically, the plurality of signal shield washers 365 may include: ring combination units (not denoted by reference numerals) locating the plurality of short pins 363 in centers thereof, and combined with the plurality of combination blocks 361, respectively; and a plurality of elastic support units (not denoted by reference numerals) formed along inner borders of the ring combination units, and extending to be inclined toward the first filter side short panel 350*a* or the second filter side short panel 350*b*.

As described above, the signal shield washers 365 provides an advantage of improving the reliability of the product by shielding the signal leakage on the side of the first filter group 50A or the second filter group 50B, of which the filtering function is inactivated, and by simultaneously absorbing the operating tolerance of the first filter side short panel 350*a* or the second filter side short panel 350*b*.

Meanwhile, from the viewpoint that the signal leakage or signal shield between the cavities in which the resonance bars 130 and the resonance bar tuning screws 135 are installed is important, the signal shield washers 365 can also be replaced by an EMI gasket even if they do not perform the above-described operating tolerance function.

In the same manner as the signal shield washer 365, The EMI gasket, although not illustrated in the drawings, may be annularly disposed to surround the peripheries around the plurality of short pins 363, and may serve to seal the respective cavities together with the plurality of combination blocks 361 by coming in close contact with the outer sides of one side filter cover 160*a* and the other side filter cover 160*b* for shielding the plurality of cavities.

Here, as referenced in FIG. 2, the plurality of combination blocks 361 may be assembled to be inserted into a combination groove 355 formed in the form of a groove on inner surfaces of the first filter side short panel 350*a* and the second filter side short panel 350*b*.

As described above, the plurality of short pins 363 are made of a metal material, and serves to make the frequency filtering that is performed during the signal flow among the plurality of cavities 120 impossible by causing a short (short phenomenon) between the resonance bar tuning screws 135 provided in the cavities 120 of the filter body 110.

Here, if the plurality of short pins 363 provided on the first filter side short panel 350*a* come in contact with the resonance bar tuning screws 135 on the side of the first filter group 50A, the first band pass filter BPF1 of the first filter group 50A may be switched to an inoperable state, and the second band pass filter BPF2 of the second filter group 50B may be switched to an operable state.

In contrast, if the plurality of short pins 363 provided on the second filter side short panel 350*b* come in contact with the resonance bar tuning screws 135 on the side of the second filter group 50B, the second band pass filter BPF2 of the second filter group 50B may be switched to an inoperable state, and the first band pass filter BPF1 of the first filter group 50A may be switched to an operable state.

Meanwhile, the plurality of short pins 363 may be installed to be elastically supported on the side of the resonance bar tuning screws 135 by pin springs 367 provided in the combination block 361 in order to absorb tolerances, such as assembly tolerances existing between the resonance bar tuning screws 135. As described above, since the plurality of short pins 363 continuously come in elastic contact with the resonance bar tuning screws 363 by the pin springs 367, the band pass filter BPF1 or BPF2 having been switched to the inoperable state can be prevented from being operated randomly.

In the switchable filter 1 according to an embodiment of the present disclosure, although it is illustrated and described that the number of the plurality of short pin modules 360*a* and 360*b* corresponds to the number of the plurality of cavities 120 and the plurality of resonance bars 130 formed on one surface and the other surface of the filter body 110, it is not absolutely necessary that the number of the plurality of short pin modules 360*a* and 360*b* corresponds to the number of the plurality of cavities 120 and the plurality of resonance bars 130, and it does no harm to provide a small number of short pin modules to the extent that the function of a desired band pass filter is stopped by causing the short in at least some points on the frequency filtering path.

Figure 9A:
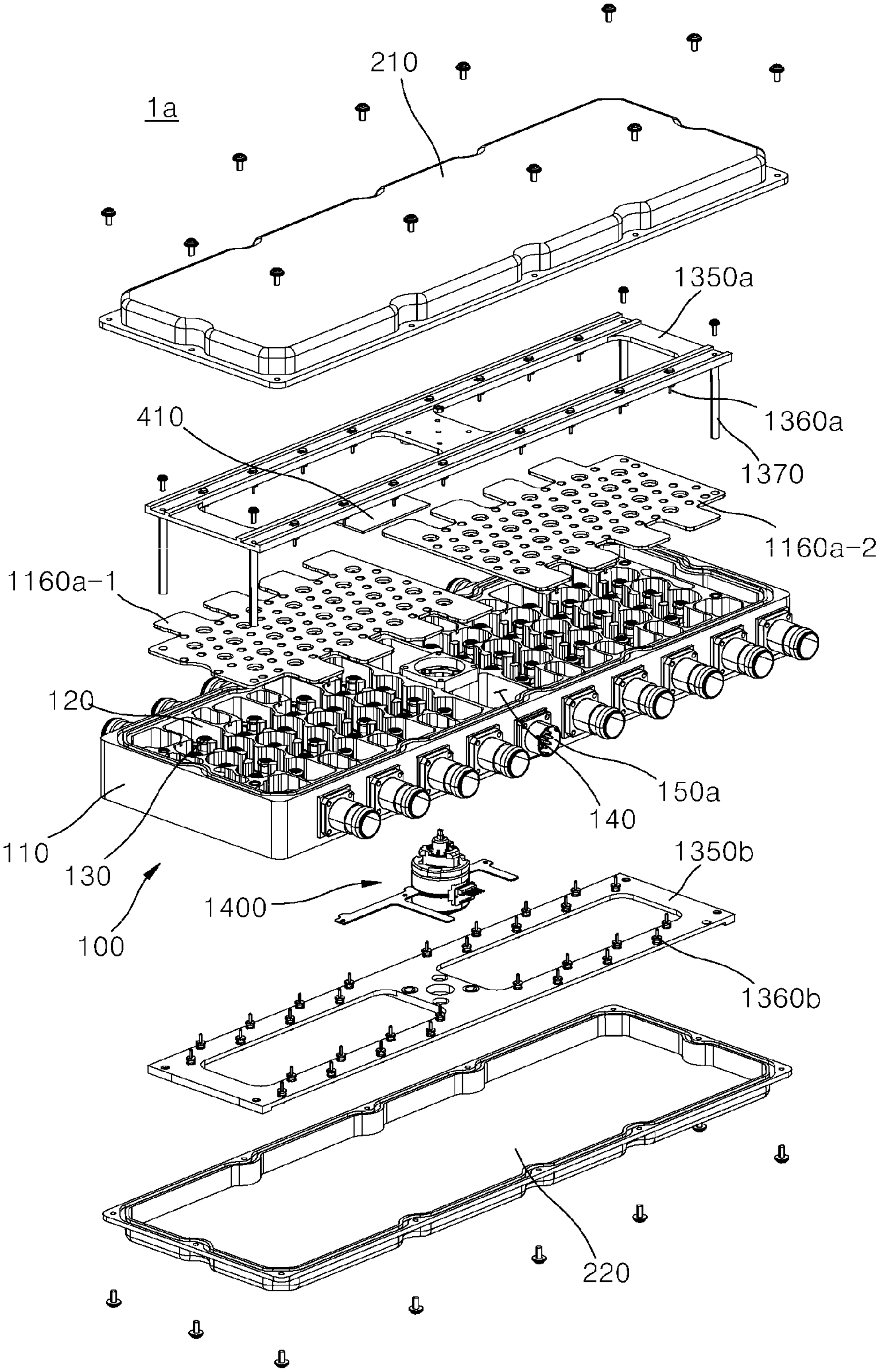
FIGS. 9A and 9B are exploded perspective views illustrating a switchable filter according to another embodiment of the present disclosure.
Figure 9B:
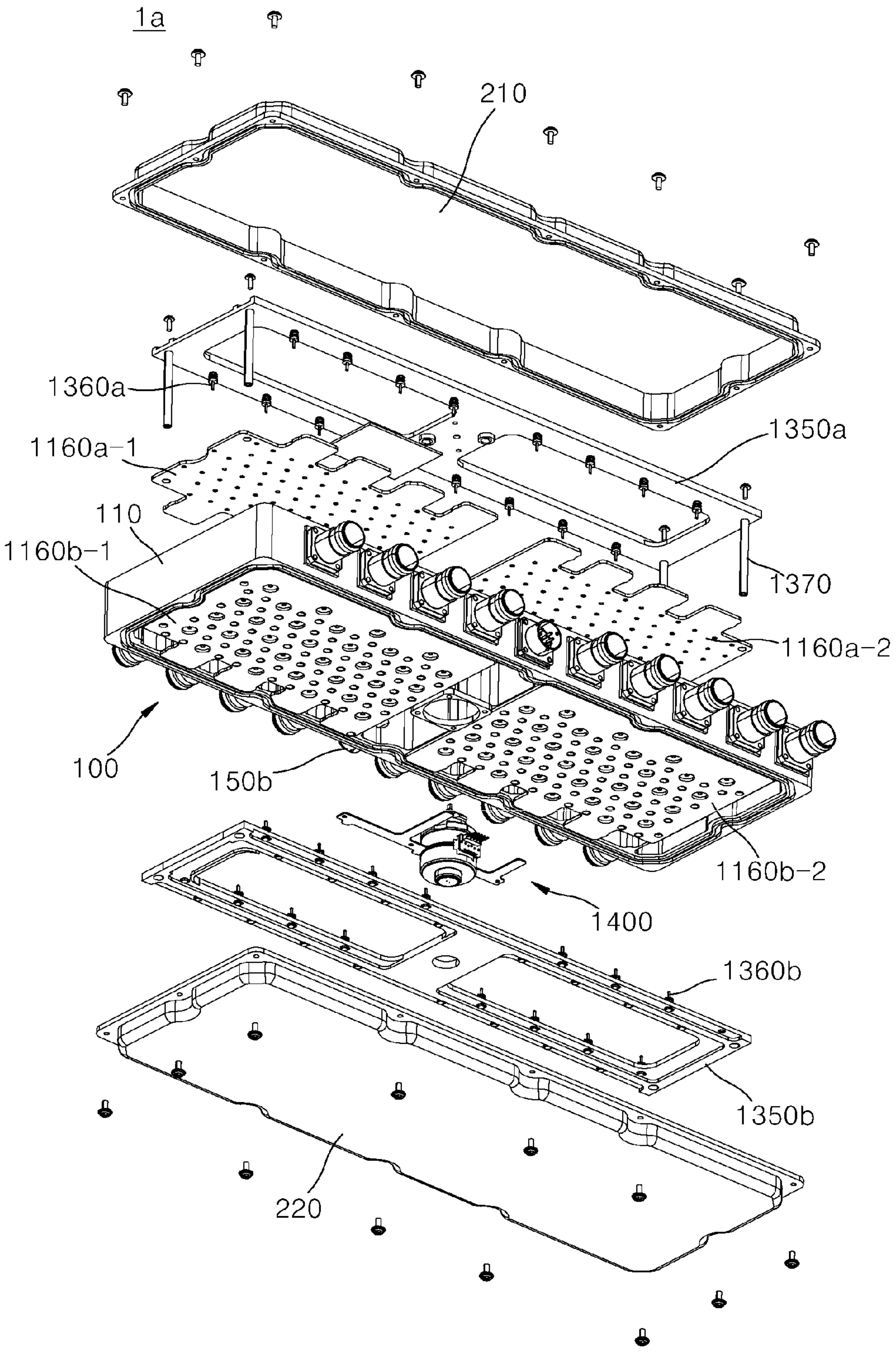
Figure 10:
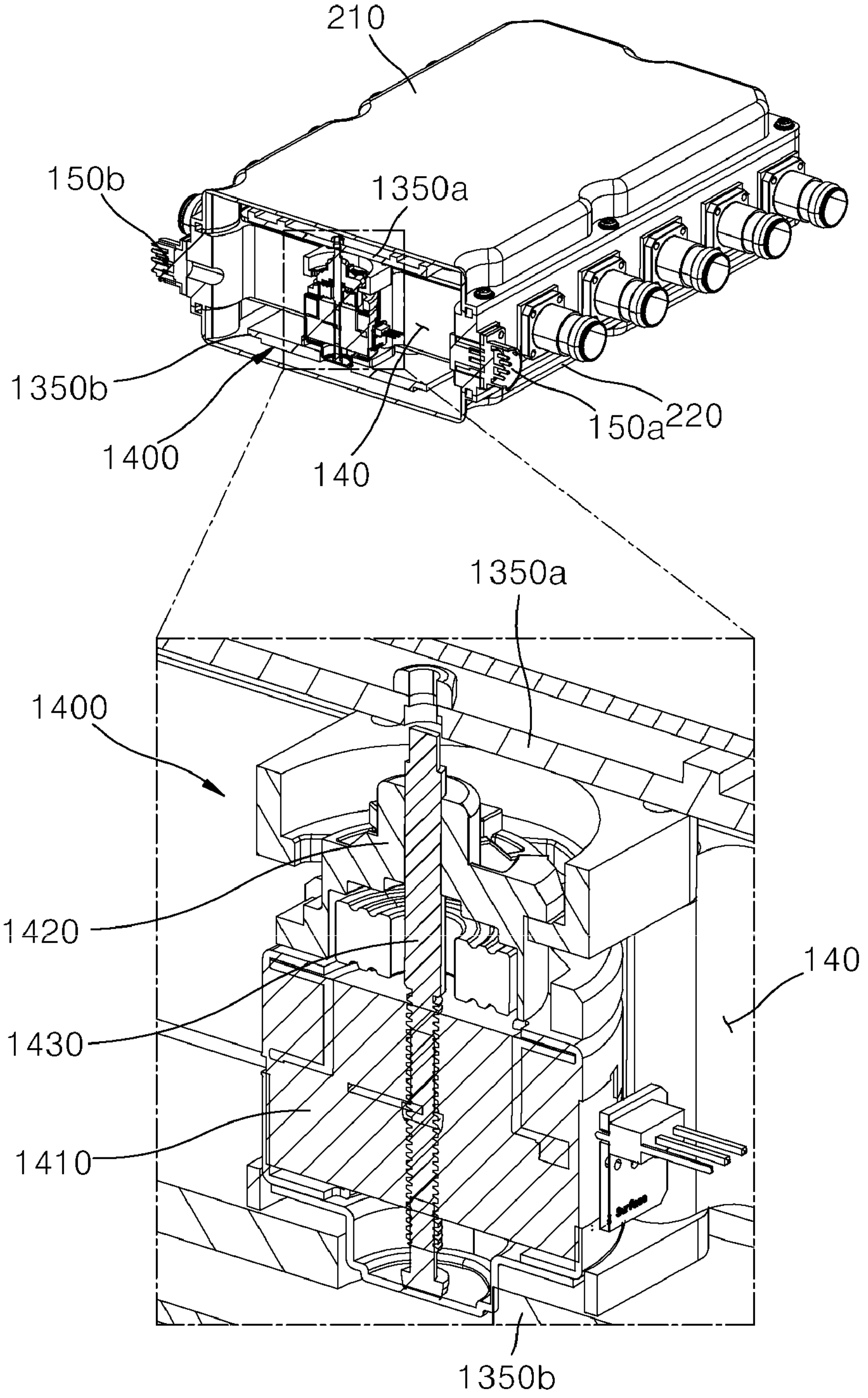
FIG. 10 is a cutaway perspective view and a partially enlarged view illustrating a short driving unit among constitutions of a switchable filter according to another embodiment of the present disclosure.

FIGS. 9A and 9B are exploded perspective views illustrating a switchable filter according to another embodiment of the present disclosure, and FIG. 10 is a cutaway perspective view and a partially enlarged view illustrating a short driving unit among constitutions of a switchable filter according to another embodiment of the present disclosure.

The switchable filter 1 according to an embodiment of the present disclosure has been described on the assumption that a pair of short driving units 400 are provided at one end part and the other end part in the length direction of the filter body 110. However, it is not absolutely necessary that a pair of short driving units 400 are provided, and as referenced in FIGS. 9A to 10, but it is also possible to provide a single number of short driving unit (refer to reference numeral 1400) in the middle part of the filter body 110 and to simultaneously move the first filter side short panel 1350*a* and the second filter side short panel 1350*b* in a straight line in the thickness direction of the filter body 110.

More specifically, in a switchable filter 1*a* according to another embodiment of the present disclosure, as referenced in FIGS. 9A and 9B, an installation space 140 that is a space being penetrated in the thickness direction may be provided in the middle part of the filter body 110, and a short driving unit 1400 may be installed in the installation space 140. A first filter side short panel 1350*a* may be provided on the first filter group 50A corresponding to the side of one surface of the filter body 110, and a second filter side short panel 1350*b* may be provided on the second filter group 50B corresponding to the side of the other surface of the filter body 110.

Here, the first filter side short panel 1350*a* and the second filter side short panel 1350*b* may be formed in an approximately rectangular shape, and a plurality of short pin modules 1360*a* and 1360*b* may be combined with opposite surfaces of the respective short panels 1350*a* and 1350*b*.

Further, corner parts of the first filter side short panel 1350*a* and the second filter side short panel 1350*b* are mutually connected by four connecting rods 1370, and thus the first filter side short panel 1350*a* and the second filter side short panel 1350*b* can simultaneously move in a straight line in the same direction by the switching driving force that is transferred from a short driving unit 1400 to be described later.

More specifically, on one side around the filter body 110, the first filter side short panel 1350*a* may be movably provided between the filter body 110 and one side outer cover panel 210, and on the other side around the filter body 110, the second filter side short panel 1350*b* may be movably provided between the filter body 110 and the other side outer cover panel 220. Further, the four connecting rods 1370 may connect the respective corner parts of the first filter side short panel 1350*a* and the second filter side short panel 1350*b* through penetration of the filter body 110.

Meanwhile, filter covers 1160 that cover the plurality of cavities 120 on one surface side and the other surface side of the filter body 110 may be separately installed at one end part and the other end part in a length direction of the filter body 110 in order to facilitate the preparation of the installation space 140 formed in the middle part of the filter body 110. That is, two one side filter covers 1160*a* may be dividedly provided at one side end part and the other side end part of the filter body 110 (refer to reference numerals 1160*a*-1 and 1160*a*-2), and two the other side filter covers 1160*b* may be dividedly provided at one side end part and the other side end part of the filter body 110 (refer to reference numerals 1160*b*-1 and 1160*b*-2).

In addition, ASIG ports 150*a* and 150*b* may be designed to be positioned in the middle part of the filter body 110 provided by the short driving unit 1400 and to facilitate the power supply and output.

Meanwhile, as referenced in FIG. 10, in the short driving unit 1400, a stator 1410 may be connected on the side of the filter body 110 in which the installation space 140 is formed, a rotator 1420 may be connected to any one of the first filter side short panel 1350*a* and the second filter side short panel 1350*b* (in another embodiment of the present disclosure, the rotator is connected to the first filter side short panel 1350*a*), and a rotary shaft 1430, which is rotated in association with the rotator 1420, may be combined to be screw-rotated through penetration of the stator 1410, so that the stator 1410 and the rotator 1420 may simultaneously move in a straight line in the thickness direction of the filter body 110, and as a result, the first filter side short panel 1350*a* and the second filter side short panel 1350*b* may move in the same direction.

Figure 11:
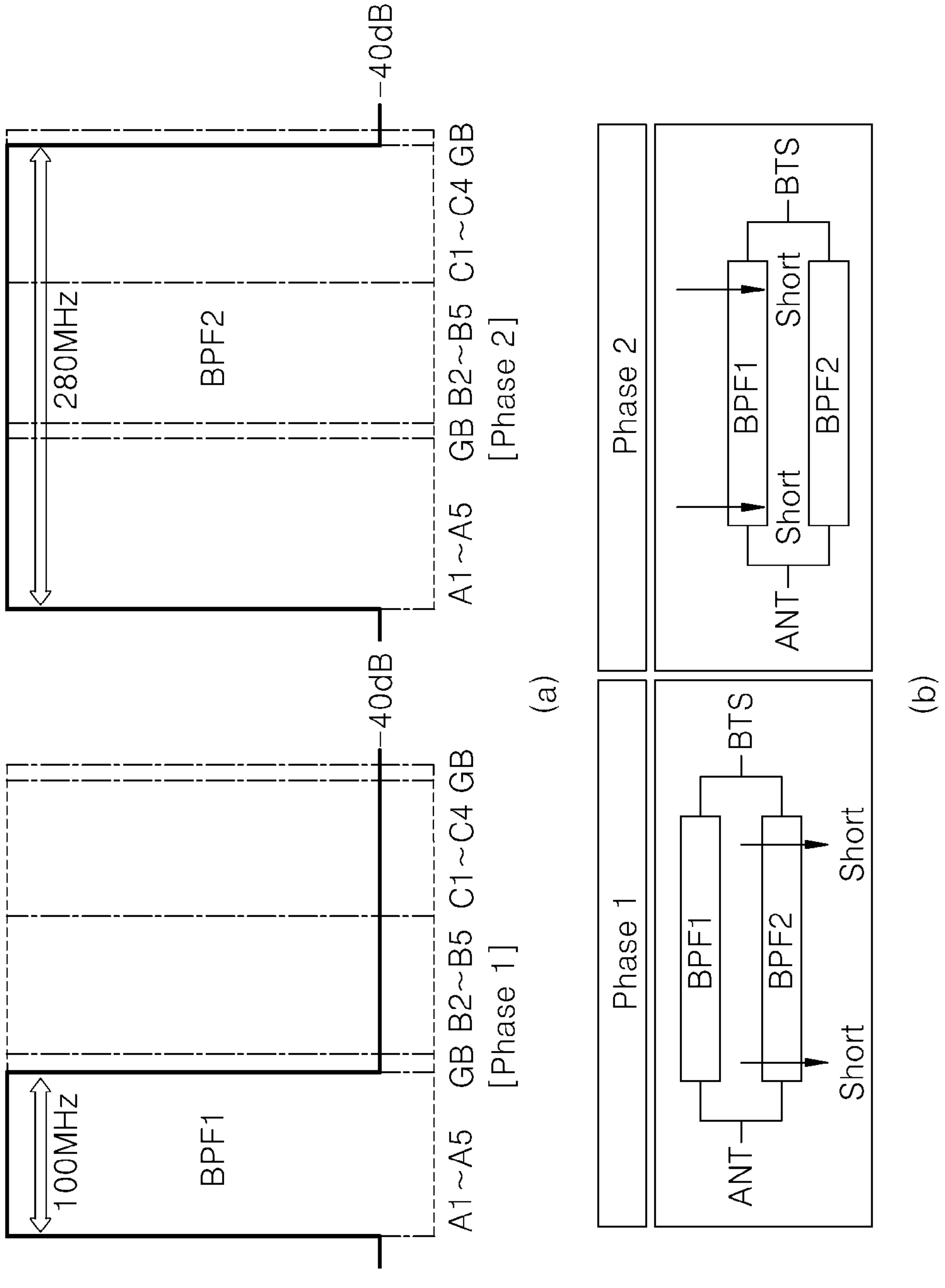
FIG. 11 is a status diagram explaining a driving control of a switchable filter according to an embodiment of the present disclosure.

FIG. 11 is a status diagram explaining a driving control of a switchable filter according to an embodiment of the present disclosure.

Since the switchable filter 1 or 1*a* according to embodiments of the present disclosure can be switched to any one band so that smooth frequency filtering becomes possible within the frequency band range to suit the allocated regional characteristics even if a different frequency band is allocated to a service provider, it can be used for general purposes even without filter replacement and change, and since it is not necessary to provide the RF switch for each section of an input port and an output port, the RF characteristics can be improved through prevention of the insertion loss from being degraded.

More specifically, among constitutions of the switchable filter 1 or 1*a* according to embodiments of the present disclosure, the frequency band switching unit 300 may be a function unit for performing switching in accordance with the frequency band BPF1 or BPF2 intended to provide the service, and may perform the switching in a manner that, for example, if frequency filtering in the band (100 MHz) of the first band pass filter BPF1 is necessary, it makes short pin modules 360*b* and 1360*b* provided on the side of the second filter side short panels 350*b* and 1350*b* among short pin modules 360*a*, 360*b*, 1360*a*, and 1360*b* come in contact with the resonance bar tuning screws 135 of the second filter group 50B, whereas if frequency filtering in the band (280 MHz) of the second band pass filter BPF2 is necessary, it makes the short pin modules 360*a* and 1360*a* provided on the side of the first filter side short panels 350*a* and 1350*a* among the short pin modules 360*a*, 360*b*, 1360*a*, and 1360*b* come in contact with the resonance bar tuning screws 135 of the first filter group 50A.

That is, as referenced in Phase 1 of FIG. 11, the switchable filter 1 or 1*a* according to embodiments of the present disclosure may perform the switching in a manner that if the short pin modules 360*a* and 1360*a* of the first filter side short panels 350*a* and 1350*a* are spaced apart from the resonance bar tuning screws 135 of the first filter group 50A by the operation of the frequency band switching unit 300, and simultaneously the short pin modules 360*b* and 1360*b* of the second filter side short panels 350*b* and 1350*b* come in contact with the resonance bar tuning screws 135 of the second filter group 50B, the band (100 MHz) of the first band pass filter BPF1 is switched to a state where the frequency filtering is possible, and the band (280 MHz) of the second band pass filter BPF2 is switched to a state where the frequency filtering is impossible.

Here, if the frequency band switching unit 300 operates in reverse, as referenced in Phase 2 of FIG. 11, the band (100 MHz) of the first band pass filter BPF1 may be switched to a state where the frequency filtering is impossible, and the band (280 MHz) of the second band pass filter BPF2 may be switched to a state where the frequency filtering is possible.

As described above, the switchable filter 1 or 1*a* according to embodiments of the present disclosure has an advantage of capable of selectively operating the band frequency of the first band pass filter BPF1 and the band frequency of the second band pass filter BPF2 through a simple switching operation of the frequency band switching unit 300.

Further, since the switchable filter 1 or 1*a* according to embodiments of the present disclosure is provided to perform the switching by mechanically causing an electrical short against the resonance bar tuning screws 135 using the plurality of short pin modules 360*a* and 360*b* even without any separate RF switch, the insertion loss and the PIMD improvement are possible among the RF characteristics, and since the RF switch that is applied for each port is excluded, the cost can be saved.

As described above, the switchable filter 1 or 1*a* according to embodiments of the present disclosure has been described in detail with reference to the accompanying drawings. However, the embodiments of the present disclosure are not necessarily limited to the above-described embodiments, but it will be apparent that various modifications and implementation within an equal scope are possible by those of ordinary skill in the art to which the present disclosure pertains. Accordingly, the true scope of the present disclosure should be determined by the appended claims.

INDUSTRIAL APPLICABILITY

The present disclosure provides a switchable filter including a frequency band switching unit which can not only improve the RF characteristics but also facilitate the frequency band selection.

The invention claimed is:

1. A switchable filter comprising:

a filter unit provided with a first filter group configured to filter a frequency of a first frequency band on one surface thereof and a second filter group configured to filter a frequency of a second frequency band on the other surface thereof based on a center partition wall; and a frequency band switching unit configured to switch the frequency band to any one of the first frequency band and the second frequency band by moving to be adjacent to or spaced apart from any one of the one surface and the other surface of the filter unit, wherein the filter unit includes a filter body provided as a cavity filter including a plurality of cavities through which the first filter group and the second filter group are open in directions of the one surface and the other surface, respectively, and a plurality of resonance bar tuning screws disposed in the plurality of cavities, respectively; and wherein the frequency band switching unit includes:

a first filter side short unit configured to come in contact with the resonance bar tuning screw of the first filter group while moving to be adjacent to the one surface of the filter body, and to be spaced apart from the resonance bar tuning screw while moving to be spaced apart from the one surface of the filter body; and a second filter side short unit configured to come in contact with the resonance bar tuning screw of the second filter group while moving to be adjacent to the other surface of the filter body, and to be spaced apart from the resonance bar tuning screw while moving to be spaced apart from the other surface of the filter body.

2. The switchable filter of claim 1, wherein the first filter side short unit and the second filter side short unit are provided as a plurality of short pin modules of a metal material, being electrically shorted when coming in contact with a front end of the resonance bar tuning screw.

3. The switchable filter of claim 1, wherein the frequency band switching unit comprises:

a short driving unit configured to be electrically driven and to generate a specific switching driving force;

a transfer panel configured to receive the switching driving force transferred from the short driving unit and to move for straight reciprocating in a thickness direction of the filter unit; and a first filter side short panel and a second filter side short panel connected to an end part of the transfer panel, respectively, provided on outsides of the one surface and the other surface of the filter body, and configured to simultaneously move the first filter side short unit and the second filter side short unit in the same direction.

4. The switchable filter of claim 3, wherein an inner space of the filter body is shielded from an outside by one side outer cover panel and the other side outer cover panel, and wherein the transfer panel, the first filter side short panel, and the second filter side short panel move in the inner space.

5. The switchable filter of claim 3, wherein the short driving unit is provided as one of each on one side and the other side in a length direction of the filter body.

6. The switchable filter of claim 5, wherein the short driving unit comprises:

a driving unit box provided in an one side inner space and the other side inner space in a length direction of the filter body;

a driving motor provided inside the driving unit box and configured to be electrically driven;

a gear set being gear-tooth-engaged with the driving motor to be rotated; and a transfer gear configured to transfer the switching driving force transferred from the gear set toward the transfer panel side.

7. The switchable filter of claim 6, wherein the gear set comprises a worm gear provided at a front end of a motor shaft of the driving motor and a worm wheel gear tooth-engaged with the worm gear, and is configured to prevent the first filter side short panel and the second filter side short panel from moving randomly.

8. The switchable filter of claim 6, wherein the transfer gear comprises:

a shaft connected to the gear set and configured to be rotated; and a cam panel configured to be eccentrically rotated about the shaft, wherein the cam panel is disposed to be inserted into and inside of a cam slot formed on the transfer panel.

9. The switchable filter of claim 6, wherein the driving motor is supplied with a power from an ASIG port configured to supply the power to the filter body to be driven.

10. The switchable filter of claim 3, wherein the frequency band switching unit activates the first filter group and simultaneously inactivates the second filter group while making the first filter side short panel be spaced apart from the resonance bar tuning screw of the first filter side short part and simultaneously making the second filter side short panel come in contact with the resonance bar tuning screw of the second filter side short unit.

11. The switchable filter of claim 3, wherein the plurality of short pin modules comprise:

a plurality of combination blocks combined with inner surfaces of the first filter side short panel and the second filter side short panel;

a plurality of short pins extending from the plurality of combination blocks toward the resonance bar tuning screws; and a plurality of signal shield washers provided on the plurality of combination blocks, respectively, and disposed annularly around the plurality of short pins.

12. The switchable filter of claim 11, wherein the plurality of signal shield washers comprise:

ring combination units locating the plurality of short pins in centers thereof, and combined with the plurality of combination blocks, respectively; and a plurality of elastic support units formed along inner borders of the ring combination units, and extending to be inclined toward the first filter side short panel or the second filter side short panel.

13. The switchable filter of claim 11, wherein the plurality of short pins are elastically supported in a direction of the resonance bar tuning screw.

14. The switchable filter of claim 11, wherein the plurality of short pin modules are spaced apart from the resonance bar tuning screw of the first filter group, and simultaneously come in contact and be shorted with the resonance bar tuning screw of the second filter group, or Wherein the plurality of short pin modules are come in contact and be shorted with the resonance bar tuning screw of the first filter group, and simultaneously be spaced apart from the resonance bar tuning screw of the second filter group.

15. The switchable filter of claim 11, wherein the number of the plurality of short pin modules corresponds to or is smaller than the number of the resonance bar tuning screws of the first filter group or the number of the resonance bar tuning screws of the second filter group.

16. The switchable filter of claim 3, wherein the plurality of short pin modules comprise:

a plurality of combination blocks combined with inner surfaces of the first filter side short panel and the second filter side short panel;

a plurality of short pins extending from the plurality of combination blocks toward the resonance bar tuning screws; and a plurality of EMI gaskets provided on the plurality of combination blocks, respectively, and disposed annularly around the plurality of short pins.

17. The switchable filter of claim 1, wherein the frequency band switching unit comprises:

a short driving unit configured to be electrically driven and to generate a specific switching driving force; and a first filter side short panel and a second filter side short panel configured to receive the switching driving force transferred from the short driving unit, provided on outsides of the one surface and the other surface of the filter unit, and configured to simultaneously move the first filter side short unit and the second filter side short unit in the same direction.

18. The switchable filter of claim 17, wherein a single number of the short driving unit is provided in a middle part of the filter body.

19. The switchable filter of claim 17, wherein the short driving unit comprises:

a stator connected to the filter body;

a rotator connected to any one of the first filter side short panel and the second filter side short panel; and a rotary shaft configured to be rotated in association with the rotator and to be screw- rotated through penetration of the stator.

* * * * *